United States Patent [19]

Zemany, Jr.

[11] Patent Number: 4,677,587

[45] Date of Patent: Jun. 30, 1987

[54] PROGRAM SIMULATION SYSTEM INCLUDING MEANS FOR ENSURING INTERACTIVE ENFORCEMENT OF CONSTRAINTS

[75] Inventor: Paul D. Zemany, Jr., Amherst, N.H.

[73] Assignee: Sanders Associates, Inc., Nashua, N.H.

[21] Appl. No.: 733,822

[22] Filed: May 14, 1985

[51] Int. Cl.[4] .............................................. G06F 15/20
[52] U.S. Cl. ..................................... 364/900; 364/300
[58] Field of Search ... 364/200 MS File, 900 MS File, 364/300

[56] References Cited

U.S. PATENT DOCUMENTS 4,386,403   5/1983   Hsieh et al. ......................... 364/300

Primary Examiner—Raulfe B. Zache
Attorney, Agent, or Firm—Richard I. Seligman

[57] ABSTRACT

An interactive simulation system for simulating an analog or a digital system defined by mathematical model representing the operation of the system. The mathematical model is represented by a network of function blocks specified by an operator, each function block providing an output corresponding to a primitive mathematical or logical operation on an input. The system iteratively steps through the network to simulate the system at sequential points in time. At least some of the function blocks represent delay functions in which their outputs are in response to the inputs during the previous iteration. The simulation system first receives from an operator the identification of the function blocks to be used in the network, the function blocks being entered from the input of the network to the output, except that any delay blocks are entered last. The system requests the operator to provide an identification of the connections to the inputs of each block, the system requesting each block's inputs in the order in which the blocks were entered and not stepping to the next until all of the inputs have been entered. When each block's input connections are entered, the system determines whether the input is provided by a previously entered block or by a block having a delay function. The system thus ensures that all of the inputs of all of the blocks are connected and that no zero-delay loops are present.

5 Claims, 11 Drawing Figures

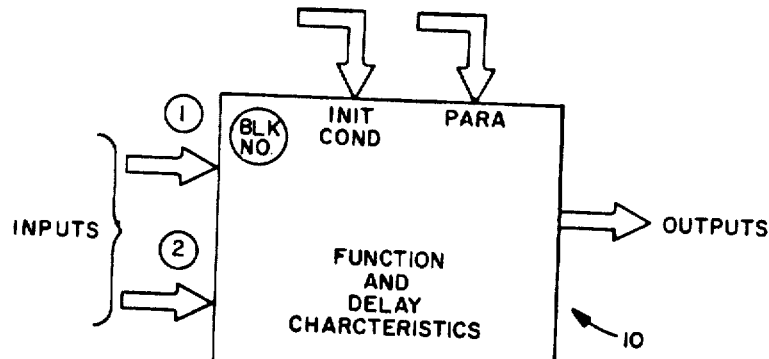

FIG. 2A

| 12 | NUMBER OF BLOCKS | | | | | | |
|---|---|---|---|---|---|---|---|
| BLK ENTRY NO. | BLK TYPE | INST NO. | INPUT TYPE | INPUT NO. | INPUT CONNECTION | OUTPUT DIM | OUTPUT TYPE |
| 1 | (X) (6X2)X (2X1) | 1 | NO DELAY | 1 | INPUT  Ⓐ | 6X1 | NO DELAY |
|  |  |  |  | 2 | INPUT  Ⓑ |  |  |
| 2 | (X) (6X2)X (2X1) | 2 | NO DELAY | 1 | INPUT  Ⓒ | 6X1 | NO DELAY |
|  |  |  |  | 2 | INPUT  Ⓓ |  |  |
| 3 | (+) (6X1)+ (6X1) | 1 | NO DELAY | 1 | OUTPUT BLK 1 | 6X1 | NO DELAY |
|  |  |  |  | 2 | OUTPUT BLK 2 |  |  |
| 4 | (−) (6X1)− (6X1) | 1 | NO DELAY | 1 | OUTPUT BLK 11 | 6X1 | NO DELAY |
|  |  |  |  | 2 | INPUT  Ⓔ |  |  |
| 5 | (X) (6X6)X (6X1) | 1 | NO DELAY | 1 | OUTPUT BLK 4 | 6X1 | NO DELAY |
|  |  |  |  | P | PAR  Ⓐ |  |  |
| 6 | (X) (6X6)X (6X1) | 2 | NO DELAY | 1 | INPUT  Ⓕ | 6X1 | NO DELAY |
|  |  |  |  | 2 | OUTPUT BLK 12 |  |  |
| 7 | (+) (6X1)+ (6X1) | 2 | NO DELAY | 1 | OUTPUT BLK 5 | 6X1 | NO DELAY |
|  |  |  |  | 2 | OUTPUT BLK 6 |  |  |
| 8 | (X) (2X6)X (6X1) | 1 | NO. DELAY | 1 | INPUT  Ⓖ | 2X1 | NO DELAY |
|  |  |  |  | 2 | OUTPUT BLK 7 |  |  |
| 9 | (+) (2X1)+ (2X1) | 1 | NO DELAY | 1 | OUTPUT BLK 3 | 2X1 | NO DELAY |
|  |  |  |  | 2 | OUTPUT BLK 8 |  |  |
| 10 | OUT (2X1) | 1 | NO DELAY | 1 | OUTPUT BLK 9 | 2X1 | NO DELAY |
|  |  |  |  | I | INIT COND  Ⓐ |  |  |
| 11 | D (6X1) | 1 | NO DELAY | 1 | OUTPUT BLK 3 | 6X1 | DELAY |
|  |  |  |  | I | INIT COND  Ⓑ |  |  |
| 12 | D (6X1) | 2 | NO DELAY | 1 | OUTPUT BLK 7 | 6X1 | DELAY |
|  |  |  |  | I | INIT COND  Ⓒ |  |  |

FIG 4B

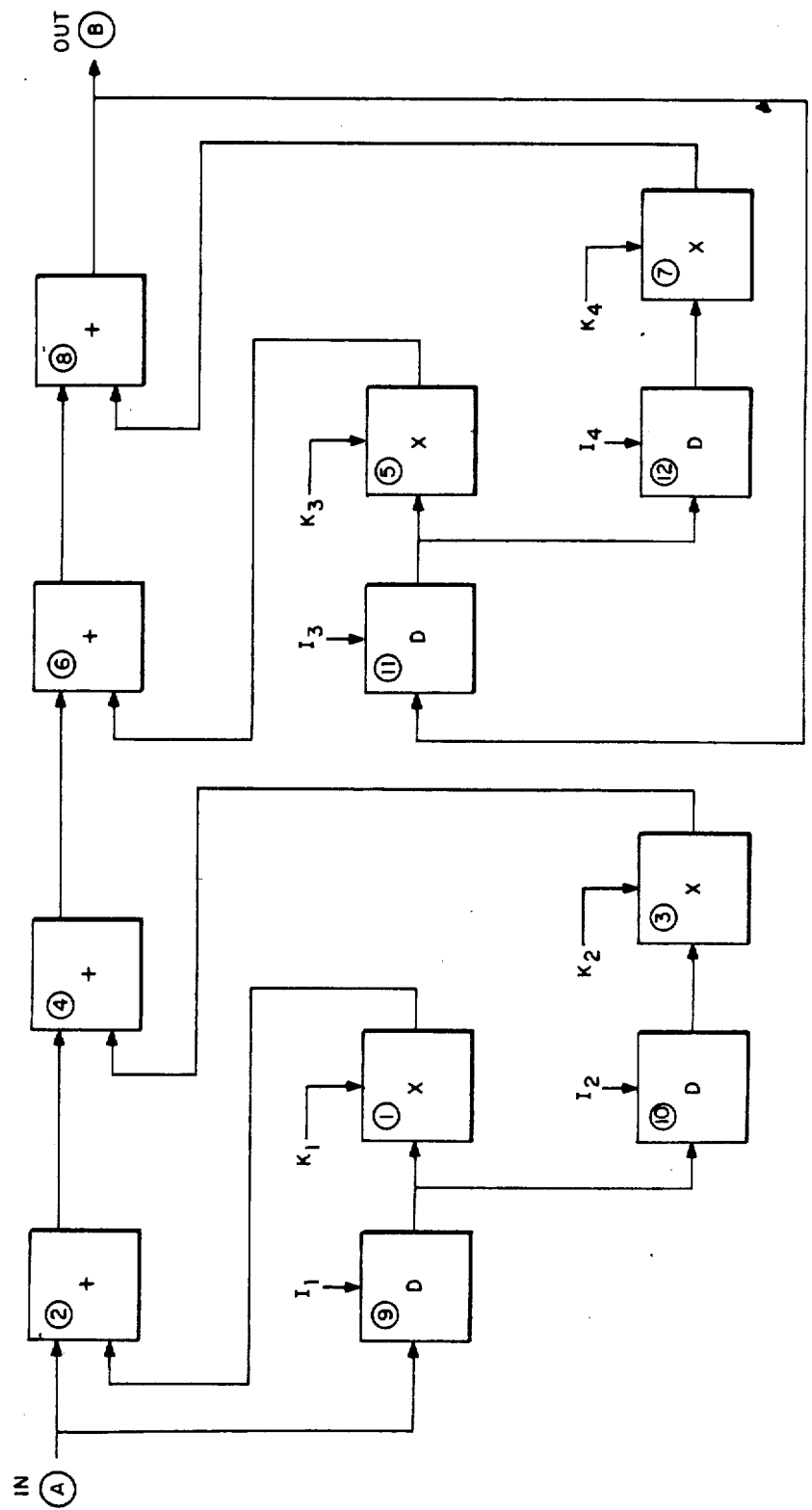

| 12 | NUMBER OF FUNCTION BLOCKS | | | | | |
|---|---|---|---|---|---|---|
| BLK ENTRY NO. | BLK TYPE | INST NO. | INPUT TYPE | INPUT NO | INPUT CONNECTION | OUTPUT TYPE |
| 1 | X | 1 | NO DELAY | 1 | OUTPUT BLK 9 | NO DELAY |
|   |   |   |   | P | PAR $K_1$ |   |
| 2 | + | 1 | NO DELAY | 1 | INPUT A | NO DELAY |
|   |   |   |   | 2 | OUTPUT BLK 1 |   |
| 3 | X | 2 | NO DELAY | 1 | OUTPUT BLK 10 | NO DELAY |
|   |   |   |   | P | PAR $K_2$ |   |
| 4 | + | 2 | NO DELAY | 1 | OUTPUT BLK 2 | NO DELAY |
|   |   |   |   | 2 | OUTPUT BLK 3 |   |
| 5 | X | 3 | NO DELAY | 1 | OUTPUT BLK 11 | NO DELAY |
|   |   |   |   | P | PAR $K_3$ |   |
| 6 | + | 3 | NO DELAY | 1 | OUTPUT BLK 4 | NO DELAY |
|   |   |   |   | 2 | OUTPUT BLK 5 |   |
| 7 | X | 4 | NO DELAY | 1 | OUTPUT BLK 12 | NO DELAY |
|   |   |   |   | P | PAR $K_4$ |   |
| 8 | + | 4 | NO DELAY | 1 | OUTPUT BLK 6 | NO DELAY |
|   |   |   |   | 2 | OUTPUT BLK 7 |   |
| 9 | D | 1 | NO DELAY | 1 | INPUT A | DELAY |
|   |   |   |   | I | INIT COND $I_1$ |   |
| 10 | D | 2 | NO DELAY | 1 | OUTPUT BLK 9 | DELAY |
|   |   |   |   | I | INIT COND $I_2$ |   |
| 11 | D | 3 | NO DELAY | 1 | OUTPUT B | DELAY |
|   |   |   |   | I | INIT COND $I_3$ |   |
| 12 | D | 4 | NO DELAY | 1 | OUTPUT BLK 11 | DELAY |
|   |   |   |   | I | INIT COND $I_4$ |   |

FIG. 3B (2×2)×(2×1) MATRIX MULTIPLY
FROM PRIMITIVE OPERATORS $$\begin{pmatrix} a_{11} & a_{12} \\ a_{21} & a_{22} \end{pmatrix} \times \begin{pmatrix} b_{11} \\ b_{21} \end{pmatrix} = \begin{pmatrix} a_{11} b_{11} + a_{12} b_{21} \\ a_{21} b_{11} + a_{22} b_{21} \end{pmatrix}$$

PROGRAM SIMULATION SYSTEM INCLUDING MEANS FOR ENSURING INTERACTIVE ENFORCEMENT OF CONSTRAINTS

BACKGROUND OF THE INVENTION

1. Field of the Invention

The invention relates generally to the field of digital data processing systems, and more specifically to systems for simulating the operation of analog or digital systems particularly by constructing and solving mathematical models of such systems.

2. Description of the Prior Art

For a number of years, computerized simulation systems have been developed to simulate the functioning of digital and analog systems, and specifically to process mathematical models of such systems onto digital computers. After a first design pass, a designer or engineer normally constructs a simulation program which embodies all of the features of the design, and runs the program on a digital computer to simulate the operation of devices constructed in accordance with the design. After obtaining the results of the simulation, the designer may then perform additional design work, and simulate the revised design. The designer may wait until he was satisfied with the result of the simulation before constructing a physical prototype of the system to verify the design, thereby saving time and expense.

Present simulation systems often require the system designer, who is generally an engineer or scientist and not a computer programmer, to come up with a custom program to use in this simulation. This generally either required the product designer himself to know considerable amount of programming, or it required the product designer to work hand in hand with a programmer to generate the simulation program. This essentially required the designer to know not only his own design specialty but also computer programming to enable him to either generate the program directly, or to be able to communicate with the programmer.

To reduce the amount of programming knowledge required by the system designer, a simulation system has been developed which use preprogrammed macro function blocks which are stored in the simulation computer and can be called up as required by the designer. Analog systems may be expressed mathematically by means of, for example, a number of differential equations which can be solved by means of differentiators, integrators, signal generators, adders and multipliers, and the simulation system includes separate macro routines for each one of these functions. All of these macro routines are separately available to the system designer. When he is preparing a simulation, all he need do is to request the function routines from the simulation computer. An executive program links the selected macro routines together in relation to the inputs to and outputs from the separate routines, and the result is a simulation program which will simulate the physical analog system in response to selected initial conditions and parameters.

Digital systems are simulated in a similar way as the aforementioned analog systems. Digital circuit elements such as logic gates, flip flops, delay lines and the like are expressed by means of macro routines stored in the simulation computer and separately called up by the system designer. The executive program can then link the routines first as the designer has interconnected the circuit elements in his logic design. The result is a program which simulates the operation of the logic circuit in response to selected input signals, initial conditions and any parameters.

In both the analog and digital simulation systems, since the macro routines have been previously written, and the system designer need only interconnect or link them as required by his preliminary design effort on his system, the designer need have little or no knowledge of computer programming. Virtually all of the programming has been provided by means of the previously defined macro routines stored in memory.

The aforementioned system has several drawbacks, however. It is difficult to ensure that all of the physical constraints have been written into the many macro routines that are required during a simulation. For example, to ensure that the resulting simulation is physically meaningful, it is necessary to ensure that all of the input values of all of the function blocks are provided, so when a macro routine is being processed, the resulting value actually is a correct result. If an input value is not provided, the simulation system may have a result that is erroneous. Furthermore, it is essential to ensure that there are no zero-delay loops which may result if, for example, the output value of a later calculation is used as an input value for an earlier-performed macro routine. It is also necessary to ensure that all initial conditions and parameters are supplied to ensure that the simulation incorporates all of the physically meaningful constraints to the greatest extent possible.

SUMMARY OF THE INVENTION

The invention provides a simulation system that enables a designer to simulate the operation of either a digital or analog system on a digital computer. For an analog system, the system is described by means of mathematical equations, for example, differential equations, the solution of which can be found by a series of mathematical steps or operations. In a digital system, the various components of the system, including the logic operators or gates and storage elements such as flip flops and registers, as well as shift registers, counters, and the like, are separately expressed by means of digital functions or routines. Each mathematical operation, in the analog case, or digital element, in the digital case, is represented by a function block, which in turn represents a program routine stored in a library in the simulation system. The program routines can be written by a programmer without any assistance by an engineer or scientist, other than information concerning the mathematical algorithms to be solved or the digital operations to be simulated by each routine, and can be called up from the library and used in a simulation by the engineer or scientist without assistance by the programmer.

Each function block is specified according to a number of characteristics, including the operation performed, the number and characteristics of required input values, the number and characteristics of required output values, the dimension, if a matrix-type operator, the number and presence of parameter inputs or initial condition inputs and the delay characteristics of the function block.

In performing a simulation, the simulation system first establishes a table into which the operator can insert function block identifications and specify their interconnection. The operator first identifies the number of function blocks to be used in simulating the system and enters the identity of each function block into the table. The function blocks are entered generally from the inputs of the system to the outputs, except that elements which have delay characteristics which can include explicit delay blocks or blocks which also perform integrations, are entered last.

After the identities of all of the blocks have been entered into the table by the operator, the simulation system retrieves the characteristics of each block from the library of routines stored therein, and requests the operator to specify the input terminal connections to the blocks. Beginning with the first block in the table, the simulation system requests the input connections to each individual input terminal. After the connection to each input terminal of the first block have been specified, the system steps to the next block and the process is repeated. This sequence continues with all of the connections to function block input terminals have been specified. The system thus insures that input data is coupled to all of the input terminals of all of the function blocks set forth in the simulation.

As each input connection is specified, the simulation system also checks to determine whether the input is from the output of a previously-entered function block, that is, from a function block having a lower block number. If not, the simulation system determines if the block, or one of the blocks connected thereto, includes a delay function. If one does, then the connection is acceptable.

By this means, the simulation system ensures that (1) input data is coupled to all of the inputs to all of the function blocks, and (2) the simulation does not include any zero-delay loops, both of which are required to ensure that the physically meaningful constraints in a simulation system have been satisfied.

The system also facilitates the definition of a macro function block from a plurality of primitive function blocks for performing specified operations. This is particularly useful for defining matrix or other complicated functions for use in many simulations.

BRIEF DESCRIPTION OF THE DRAWINGS

This invention is pointed out with particularity in the appended claims. The above and further advantages of this invention which may be better understood by referring to the following detailed description taken in conjunction with the accompanying drawings in which:

FIG. 2A is a graphical representation of a function block that is used by the simulation system depicted in FIGS. 1A-1D.

FIGS. 3A and 3B contains an example useful in illustrating the interconnection of several types of function blocks depicted in FIGS. 2A and 2B;

FIGS. 4A and 4B are further examples illustrating the use of the simulation system in connection with matrix-type operators.

DETAILED DESCRIPTION OF THE PREFERRED EMBODIMENTS

Figure 1A:
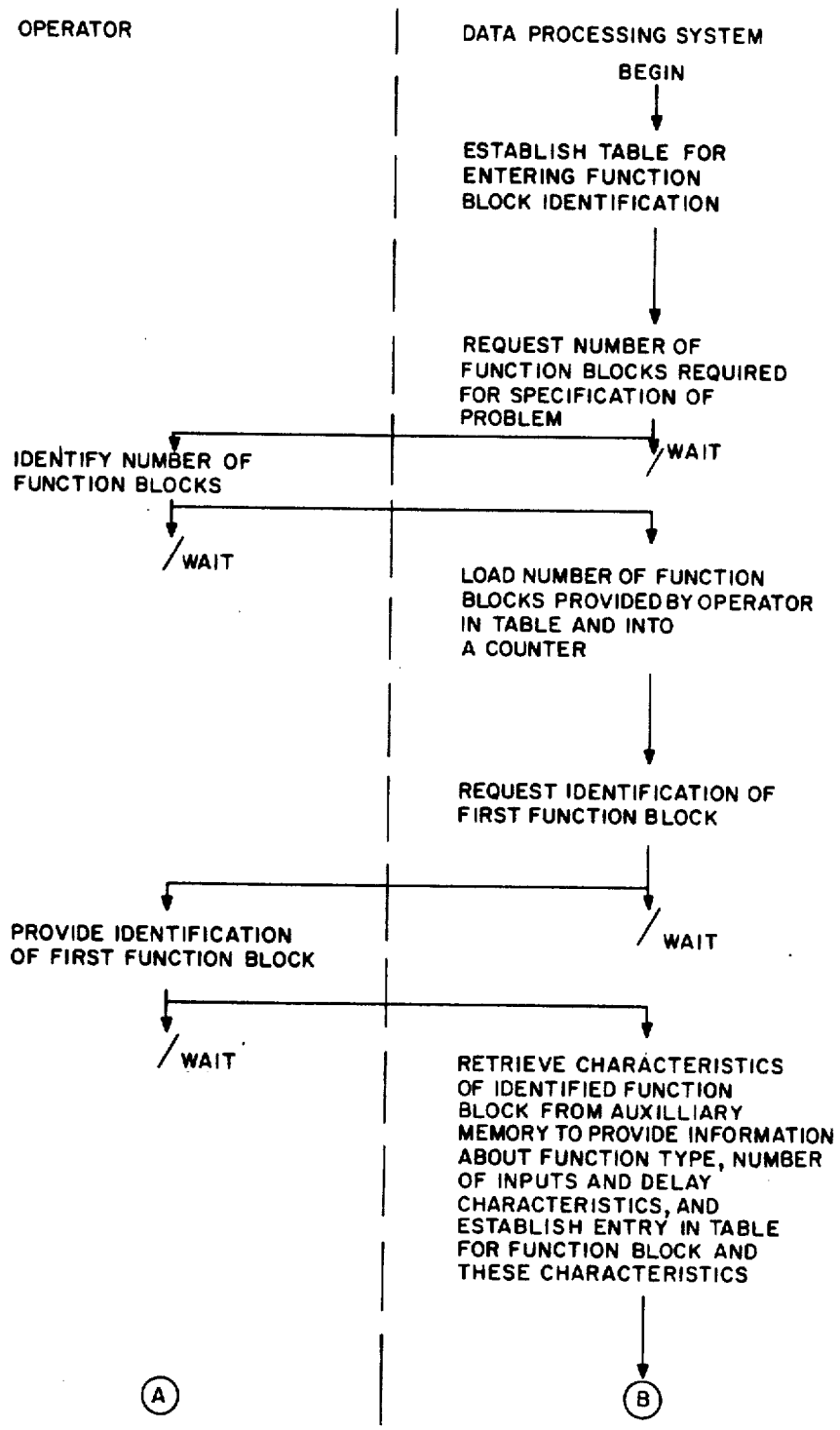
Figs. 1A-1D contain a flow diagram detailing the operations performed by the simulation system.

The simulation system described herein, in one embodiment, is in the form of a digital data processing system having an executive program which enables the system to perform the operations depicted in Figs. 1A-1D. The digital data processing system is in a conventional form, including a processing unit connected to a main memory and having one or more secondary storage systems such as disk or tape drives and one or more terminals, such as video display and keyboard units permitting interaction with an operator. Since these elements are conventional, they are not depicted herein; however, it should be recognized that they may be used with the invention. In addition, a special purpose system can be devised in a known manner to perform the simulations described herein.

The invention provides an interactive system for performing simulations of both analog and digital systems and for ensuring that all physical constraints have been satisfied. The operation of analog systems may be modeled mathematically using differential equations, and the simulation system described herein provides solutions for the differential equations in response to initial conditions and parameters as supplied by the operator. The operation of digital systems may be modeled by means of operators which perform Boolean operations on logical input values supplied by an operator and provide logical output values representing the response of the digital system to the input values. The system provides the required simulations on an iterative basis, with each iteration representing the response of the system at a particular time to input values provided by an operator.

Each arithmetic and logical operation is represented in the system, and particularly on a video display screen, by a function block. In a computer programmed to perform the simulation, the function block would comprise a program routine that receives certain input values, which may include program variables which represent input values and constant values representing initial conditions and parameters, perform operations relative to the input values and transmit output values. If the input values are arranged in matrix form, and the operation performed by the block is a matrix operation, the block is also specified by the matrix size. A function block is also specified by its delay characteristics; that is, a function block may receive input values and perform a calculation during one iteration, but transmit the results of that calcuation during a subsequent iteration. If that occurs, the function block also has an input value as an initial condition for transmission through the output at or during the initial iteration.

In one embodiment of the simulation system, the function block programs for the function blocks are stored as library programs available to operators of the system in a similar manner as library subroutines that are available to programs written in high level languages such as FORTRAN and COBOL.

FIG. 2A depicts an icon 10 which may be used as a symbol to represent a function block. The icon is used in the examples depicted in FIGS. 3 and 4 to represent a function block. A function block is specified by its function and delay characteristics, which include the arithmetic and/or Boolean function performed by the program represented by the function block. The inputs to the block are noted to the left, and the initial condition and parameter inputs are shown as being from above. The function block outputs are to the right. In addition, if the function is a matrix function, the sizes of the matrices on which operations are performed by the function block is specified. Finally, the block includes a block number (BLK NO) which is used to identify the number of the block in a table.

Figure 2B:
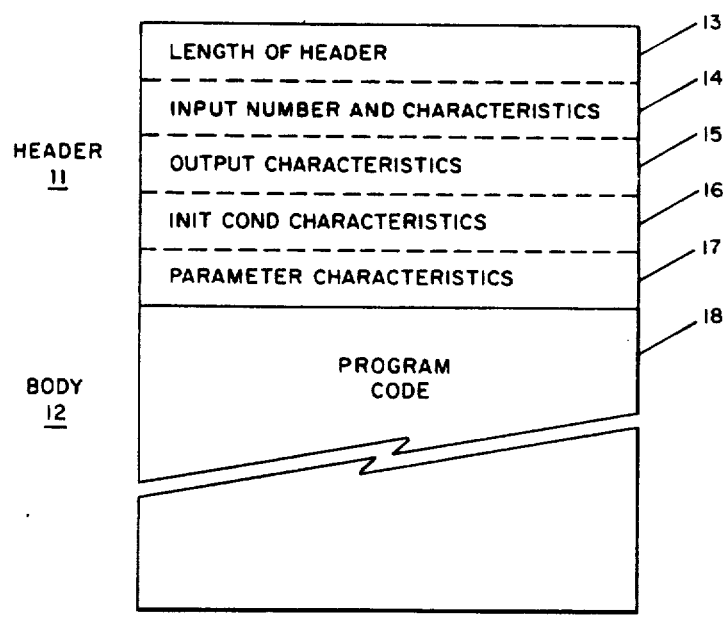
FIG. 2B illustrates the actual structure of the function block.

FIG. 2B represents the structure of the function block 10 (FIG. 2A). The function block includes a header portion 11 and a body portion 12. The header 11 includes a series of fields which define a number of characteristics of the function block. The first field is a length field 13, which specifies the length of the header. After the length field are input and output specification fields 14 and 15, which are always present. The input specification field specifies the number and characteristics of the inputs. For example, if the function block performs a matrix operation, the input characteristics would include the dimension of the matrix requried at each input. The executive program uses this information to ensure that the matrix dimension of the output to which the input is connected corresponds to the input's required matrix dimensions. Other input specification information includes whether there is a delay at the input. Similarly, the output specification field 15 identifies the matrix dimensions of the outputs and its delay characteristics.

In addition, the header portion 11 may include initial condition and parameter input characteristic fields 16 and 17. These fields may not be present in all function blocks. If the function block does not require initial conditions or parameters, fields 16 and/or 17 may not be present. Like the input and output characteristic fields 13 and 14, the initial condition and parameter characteristic fields 16 and 17 include the matrix dimensions of the initial condition and parameter inputs, if the function block represents a matrix operation.

The header 11 may also include fields (not shown) for other information, such as whether the block represents an integration function or some other operation which has an inherent delay in it.

The body 12 of the function block 10 contains the actual program code which is used to enable the simulation system to perform the required operation as specified by the function block. The executive program retrieves the code and links it with other code to produce a program for actually performing the required simulation when the simulation is executed.

FIG. 3A depicts a network of function blocks that are interconnected to illustrate a simulation, specifically for a second-order recursive filter. The equation for the filter is depicted below the function block network. The network includes twelve function blocks, each identified by a block number in the upper left-hand corner of the icon representing the function block. With reference to the Figure, the filter generates an output signal B at an iteration "n" in response to the input signal A at that iteration and the input and output signals during the previous two iterations "n−1" and "n−2".

Thus, in the illustration of FIG. 3A, the output of function block 9 represents the input signal A at the previous iteration "n−1" and the output of function block 10 represents the input signal A at the second previous iteration "n−2". Similarly, the output of function block 11 represents the value of the output signal B at the previous iteration "n−1" and the output of the function block 12 represents the value of the output signal B at the second previous iteration "n−1".

Function block 1 represents a multiplication block that multiplies the value of the previous input signal, provided by function block 9, by a constant parameter $K_1$ to provide the $K_1 A_{n-1}$ term of the filter equation. During the first iteration, the initial condition I is provided by block 9 as the delayed value of the A input signal. Block 2 receives the A input value and adds it to the product from block 1, thus providing the sum $A + K_1 A_{n-1}$.

Function block 3 represents a multiplication block that multiplies the value of the second previous A input signal, provided by block 10, by a constant parameter $K_2$ to provide the $K_2 A_{n-2}$ term of the filter equation. During the first iteration, the initial condition $I_2$ is provided by block 10, representing the twice-delayed value of the A input signal, and during the second iteration, the initial condition $I_1$ from block 9 is provided as the twice-delayed value of the A input signal. Block 4 receives the output value from blocks 2 and 3 and provides their sum, namely $A_n + K_1 A_{n-1} + K_2 A_{n-2}$.

Function blocks 5, 7, 11 and 12 operate in the same way on the B output signal as blocks 1, 3, 9 and 10 operate on the A input signal, and provide the values $K_3 B_{n-1}$ (block 5) and $K_4 B_{n-2}$ (block 7). Block 6 receives the output values from blocks 4 and 5 and provides the sum $A_n + K_1 A_{n-1} + K_2 A_{n-2} + K_3 B_{n-1}$. Similarly, block 8 receives the output values from blocks 6 and 7 and provides the output value B of the filter, namely, $A_n + K_1 A_{n-1} + K_2 A_{n-2} + K_3 B_{n-1} + K_4 B_{n-2}$.

The operations performed by the simulation system in simulating the filter depicted in FIG. 3A will now be described in connection with FIGS. 1A-1D and FIG. 3B. With reference to FIG. 1A, the system first establishes a table into which the operator can enter a function block. Specifically, the system establishes the table depicted in FIG. 3B, that is, the rows and columns without, the entries depicted therein. The table includes a number of rows and columns, with each row representing a different block, and the columns being available for an operator to enter a specific kind of information about the block. At the top of the table is an entry for a number identifying the number of function blocks to be used in the simulation.

After establishing the table, the simulation system requests the operator to identify the number of function blocks to be used in the simulation. After the operator provides this number, the system loads the value into the specified location of the table and also into a counter. The system then asks the operator for the identification of the function blocks one at a time.

When the operator identifies each function block, the system retrieves the characteristics of the block as specified in the header, such as the number and type of input values required and the delay characteristics of the block, and inserts the information into appropriate locations in the table. The order of entry of the function blocks into the table follows two rules, specifically (1) the blocks having delay characteristics are entered last, and (2) blocks which receive input values from other blocks, unless those inputs are from blocks having delays or are in branches having delays, are entered after the blocks from which they receive input values. Each time the operator provides the identification of a function block, the system decrements the counter. When the counter reaches zero, no more function blocks are entered.

Accordingly, the operator first enters the "multiply" block identified in FIG. 3A as block number 1, when the system requests. Since this is the first time this type of function block has been entered, the system loads in an "INST NO" instantiation number column the value "1". The system also identifies the number and type of input and output terminals to be connected, in this case a input terminal No. 1 and the P (parameter) terminal, which receives a parameter input value, as well as their dimensions, if the block is a matrix operator, and the delay characteristics, if any. The other function blocks are entered, with the blocks having explicit or inherent delay function, including, for example, blocks representing integration operations, being entered last.

After all of the blocks are entered, the system requests the operator to specify the connections to the various inputs. The system counts the number of blocks entered and loads the number into an entry counter. The system first decrements the entry counter, and subtracts the contents of the entry counter from the total number of blocks to identify the blocks whose input connections are being identified. The system identifies the number of inputs to be connected, and loads that value into an input counter. In the case of function block 1, the block has two terminals for inputs, namely input "1" for receiving an input value from another block or from an operator-supplied variable input signal, and parameter input "P" (see FIG. 2) for receiving a constant parameter value which will remain the same throughout the simulation, and the system loads the value "2" into the input counter.

The operator then is requested to identify the source of the first input value. In this case, the source is function block 9. If, as here, the source is a later-entered function block, that is, one having a higher block number, the system tests to determine whether the other block has a delay characteristic. Since blocks with delay are entered last into the table, they will have higher block numbers than those without delays. It will be appreciated that the system can also check to ensure that, when the blocks are entered, no non-delay blocks are entered after the operator begins entering blocks with delay. If the operator enters a connection to a block having a higher block number that does not have a delay characteristic, a zero-delay loop is present in the function block interconnection, and the operator has made an error in the interconnection. However, if the later-entered block does have a delay characteristic, no zero-delay loop is present in the simulation.

After a first input connection is entered, the input counter is decremented, and the value of the input counter is tested. If the value is not zero, all of the inputs of the function block have not been entered, and the system returns to prompt the operator for the next input connection to the function block. If the value of the input counter is zero, all of the connections to the function block's inputs have been entered, and the system steps to the next function block and obtains the inputs for that block.

Figure 4A:
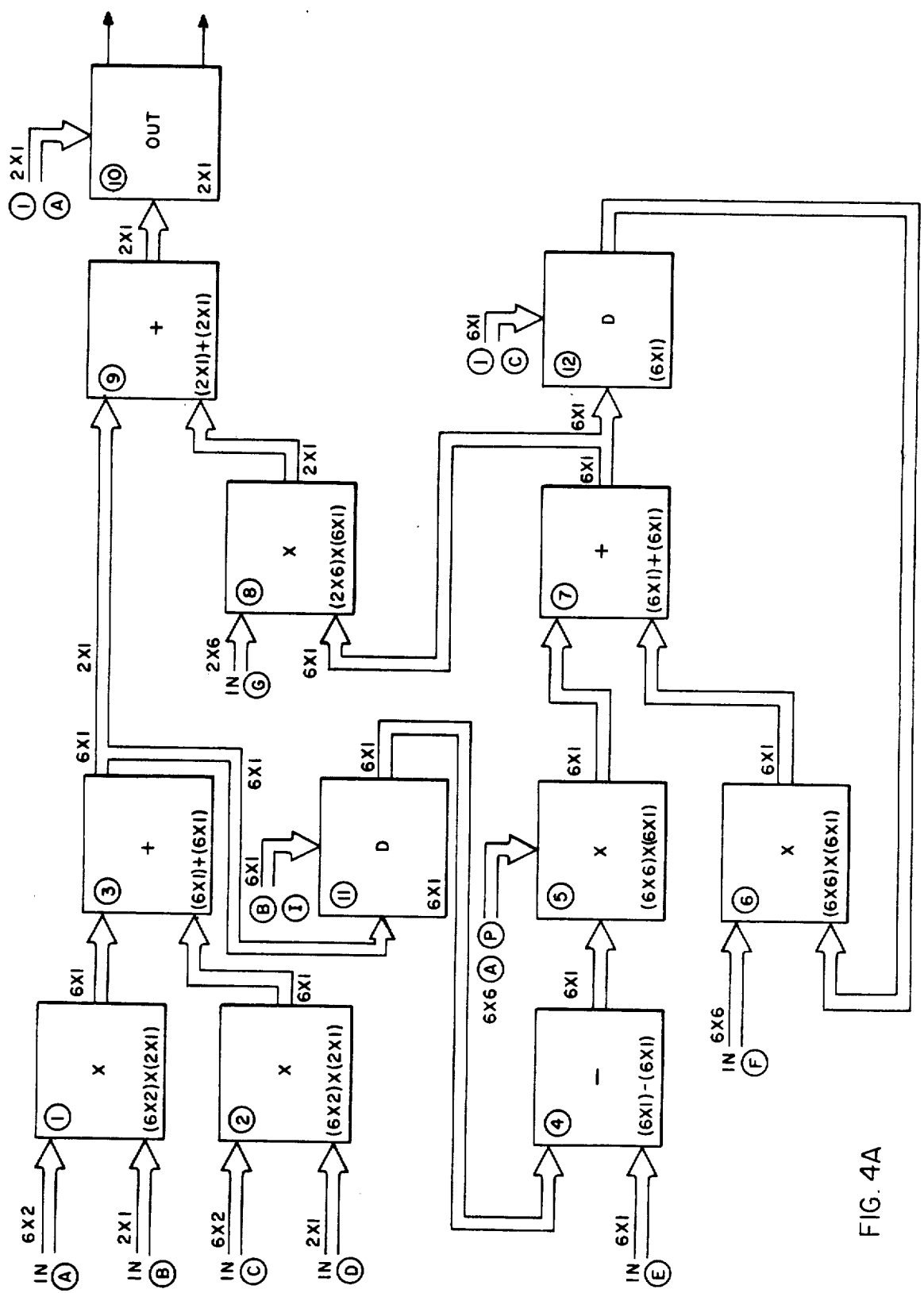

After all of the input connections have been specified the system retrieves the program code in the body portion 12 represented by the function blocks, links them together, and executes the result. FIGS. 4A and 4B depict a second example of the use of the simulation system, including a network of 12 function blocks which perform matrix operations, each block being identified by a block number in the upper left hand corner. The network includes five multiplication blocks numbered (1), (2), (5), (6), and (8). It should be noted that since the function blocks perform operations on three different matrix sizes, as indicated by the legends in the lower left hand corner of the respective function blocks, they actually represent three distinct types of function blocks which are actually macro blocks representing combinations of primitive blocks previously linked by the executive program as described hereinafter. Different program routines are normally provided for the three types of blocks. Furthermore, the network of FIG. 3 includes three addition function blocks, namely, blocks (3), (7), and (9). Blocks (3) and (7) operate on the same size matrix, and therefore represent the same program, but block (9) represents an addition operation on a different matrix size, and therefore represents a different program.

Block (4) represents a subtraction block, which is similar to the addition blocks represented by blocks (3), (7), and (9), except that the operation performed is a subtraction. Block (10) represents an output element which represents an output buffer or a delay element. In addition, blocks (11) and (12) represent delay elements as described above, except that they operate on a plurality of input values at the "1" input in parallel, the number of inputs specified by the matrix size. Any arithmetic function block may also include a delay characteristic, in which case the function blocks with delay represent different function blocks from the function blocks performing the same arithmetic function, but without the delay.

The operations performed by the data processing system in connection with the network of matrix operators depicted in FIGS. 4A and 4B will be described in connection with FIGS. 1A through 1D. With reference to FIG. 1A, the data processing system first establishes the table (FIG. 4B) for entering the identifications of function blocks selected by the operator to simulate a system.

After establishing the table, the data processing system requests the number of function blocks required to specify the problem or system being simulated. The simulation depicted in FIG. 4A requires 12 function blocks, so the operator enters the number "12" into the system, which the system then places at the uppermost row of the table, as shown in FIG. 4B.

The data processing system then begins requesting the identifications of the function blocks to be used in the simulation. The operator identifies the function blocks beginning preferably from the inputs to the network and proceeding towards the outputs, except that all elements with delay are entered after all elements without delay features. The first function block identified by the operator is the function block in the upper left-hand corner of FIG. 4A, namely block representing a (6×2) by (2×1) matrix multiply operation. This is entered into the simulation system by the operator, and the system loads the identification of the function block into the first row of the table, as shown in FIG. 4B. Since this is the first function block of this type, the system loads the number (1) into the "INST NO" (instantiation number) column of the table. The data processing system also identifies the delay characteristics at the input and output of the function block, as shown in the "input type" and "output type" columns of the table. The system also loads the number and types of input connections in the "input no" column, and the output dimension of the matrix multiply. It should be noted that, although only two slots are noted for inputs, the system will actually require fourteen input connections, since the block represents a matrix multiplication operation on matrices having dimensions of (6×2) and (2×1). However, since all of the matrix input values to each input must come from the output from one block, all of the individual values can be treated as a single collective input. The only entry in the first row of the table which is not filled at this time is the input connections.

Figure 1B:
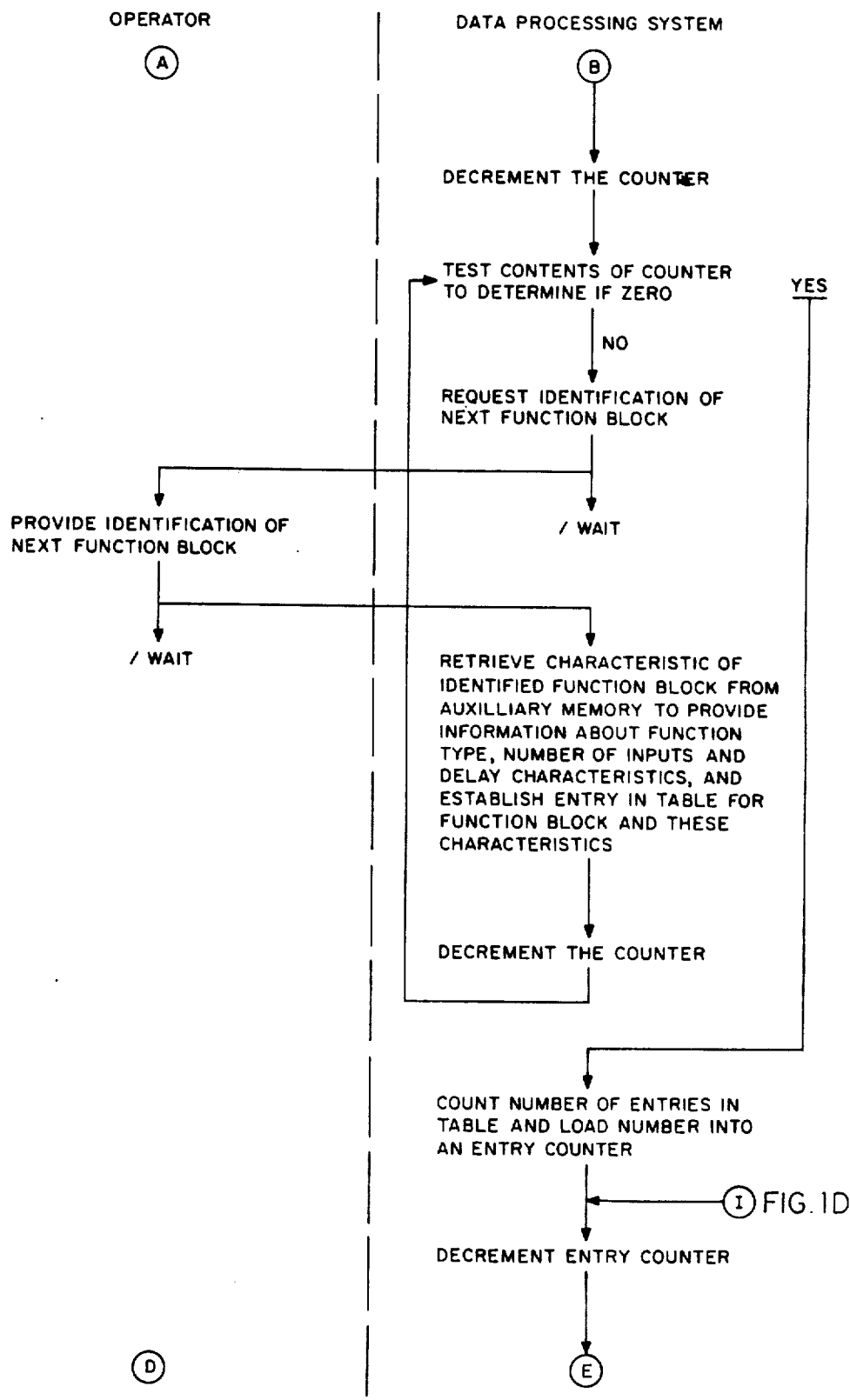

After entering the information concerning the first block in the network depicted in FIG. 4A into the table depicted in FIG. 4, the data processing system determines whether all of the function blocks have been entered. After obtaining the identification of the first block, the system, as illustrated at the top of FIG. 1B, decrements the counter and tests the contents of the counter to determine if the contents of the counter is zero. If the contents of the counter is zero, all of the function blocks have been entered into the table. If the contents of the counter is not zero, the data processing system requests the identification of the next function block. When this is provided by the operator, the data processing system again retrieves the characteristics of the identified block, loads it into the appropriate row in the table in FIG. 4B, decrements the counter, and returns to test if the contents of the counter is zero. The data processing system remains in this loop until the contents of the counter has decremented to zero, in which case all of the function blocks have been identified by the operator and their characteristics loaded into the table of FIG. 4.

As shown in FIG. 4B, after all of the non-delay elements have been entered, the delay elements are then entered using the same sequence. Returning to Fig. 1B, after the table of FIG. 4 is loaded, the data processing system leaves the function block identification loop and enters the sequence in which it requests the identification of the input connections for the function blocks. The system first counts the number of entries in the table of FIG. 4 and loads the number into an entry counter and then decrements the entry counter. Proceeding to FIG. 1C, the system then subtracts the contents of the entry counter from the total number of entries, that is, the number of blocks identified at the top of the table of FIG. 4, to identify a block entry in the table. If, for example, the entry counter has been decremented by one, which occurs during the first sequence through this loop, the results of the operation of the top of FIG. 1C will identify the first block entry number depicted in FIG. 4.

The data processing system then determines the number of inputs to the identified function block and loads that number into an input counter. The data processing system then requests the identification of the connection to the input identified by the input counter with respect to block number 1, eight input connections are required and the value "eight" is entered into the input counter. After the operator identifies each requested connection, the data processing system loads the identification of the source into the appropriate slot in the table depicted in FIG. 4B. Thus, with reference to FIG. 4A, the source of the input to the six inputs generally labelled input number 1 (see FIG. 2) of block number 1 is identified as input A. When these inputs are identified by the operator, the data processing system loads that into the upper slot in the "input connection" column of the first row of FIG. 4, which corresponds to input number 1 for block entry number 1.

Figure 1C:
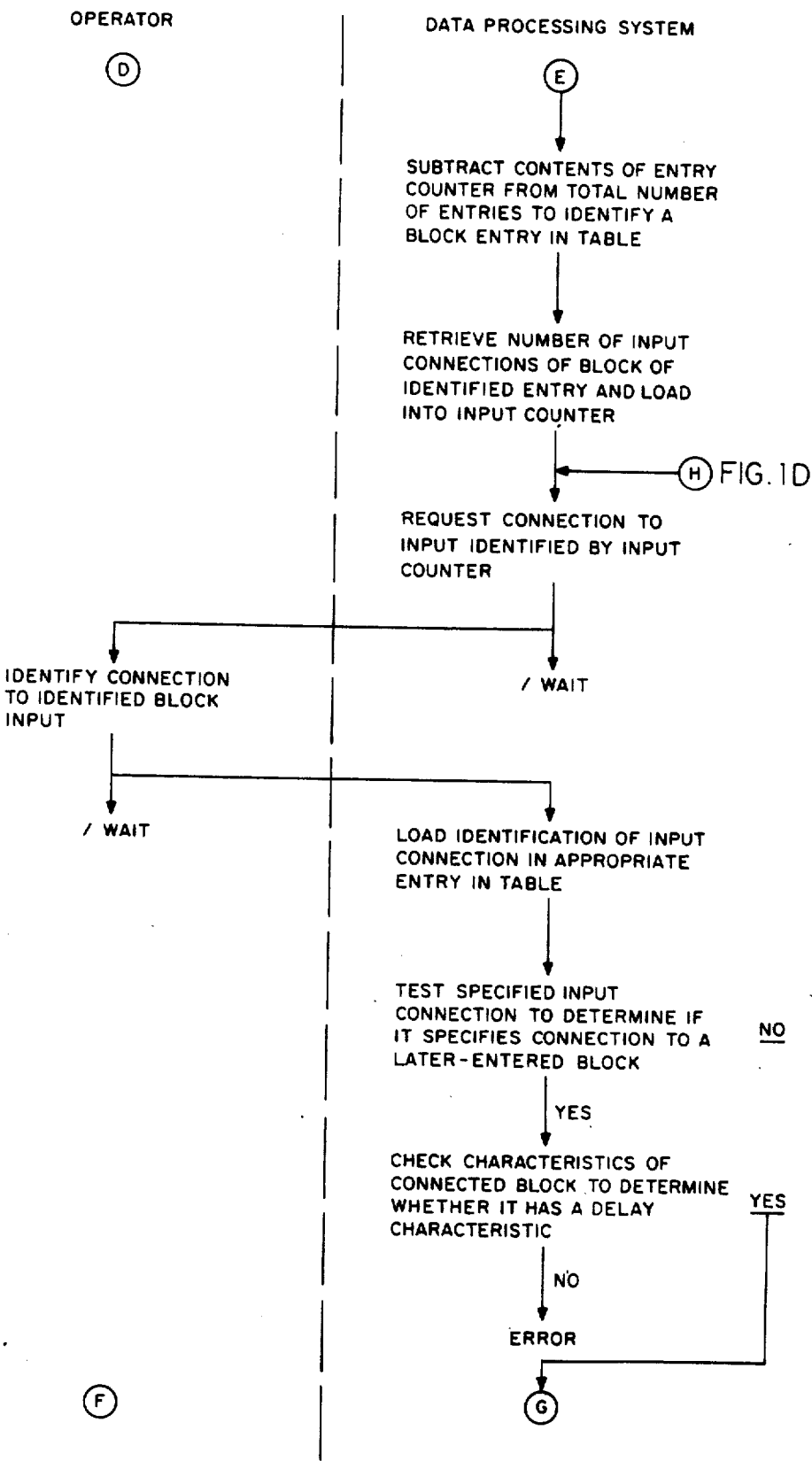
Figure 1D:
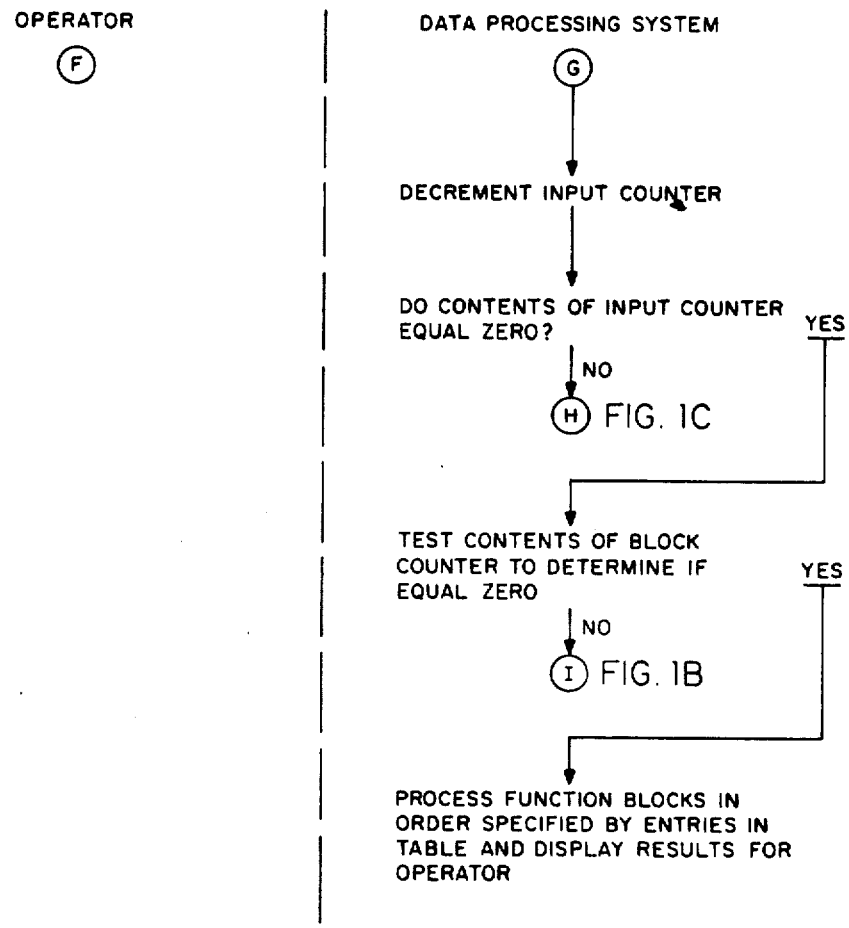

After loading the identification of each input connection into the appropriate slot in the table depicted in FIG. 4B, the data processing system performs the tests to determine if it specifies connection to a later entered block. Since the first input of the first block entry is not connected to a block with a higher block number, the data processing system steps to the sequence beginning at the top of FIG. 1D. The system then decrements the input counter by the number of input connections made, tests to determine if the input counter is zero. If not, the system returns to request another input connection from the operator (FIG. 1C). If the contents of the input counter equals zero, all of the inputs have been connected, and the system tests to the block counter to determine if its contents equals zero. If they do not, the data processing system returns to the bottom of FIG. 1B to request the input connections to the next block in the table of FIG. 4. As is apparent, unless all of the input connections have been entered, the system does not step to the next block and thus the system ensures that all function block inputs receive input values.

With reference again to FIG. 1C, if an input connection is specified to a block which is entered later into the table in FIG. 4, that is, if the input connection is from a higher numbered block, then a loop is present, and the data processing system tests the inputting block to determine if it has a delay characteristic. If it does not, then there is a zero delay loop in the simulation, and an error is indicated. However, if the connected block does have a delay characteristic, then a zero delay loop is not present, and the data processing system continues to request input connections.

As will be appreciated, the data processing system is only required to test that the inputs are all connected and that there be no zero delay loops to ensure that the physical constraints of a simulation are satisfied. It does not require all of the outputs to be connected, and specifically does not require all of the outputs to be connected to all of the inputs. This is illustrated in FIG. 4A, in which the outputs of block 3 are connected to the inputs of block 9 and the inputs of delay block 11. However, it should be noted that of the six output lines from function block 3, only two of the lines are connected to block 9. As long as all of the inputs are connected to receive input values, and the delay characteristics are enforced, all of the physically meaningful constraints of the system are satisfied.

After the operator has entered all of the function blocks into the table (FIG. 4) as requested by the data processing system, the data processing system retrieves the program for each block in sequence, applies the inputs to the function block, obtains a value and proceeds to the next function block. After all of the function blocks have been processed, the result of the simulation is available at the output of the data processing system.

As has been noted above, the executive program may, at the instruction of an operator, establish a macro function block from any combination of relatively primitive blocks. In this operation, the executive retrieves the header 11 and program code information for each primitive block and establishes a new block. The header of the new block contains a composite of headers of the primitive blocks, organized as required by the macro function specified by the operator. The program code is also linked as specified for the macro function.

Figure 5:
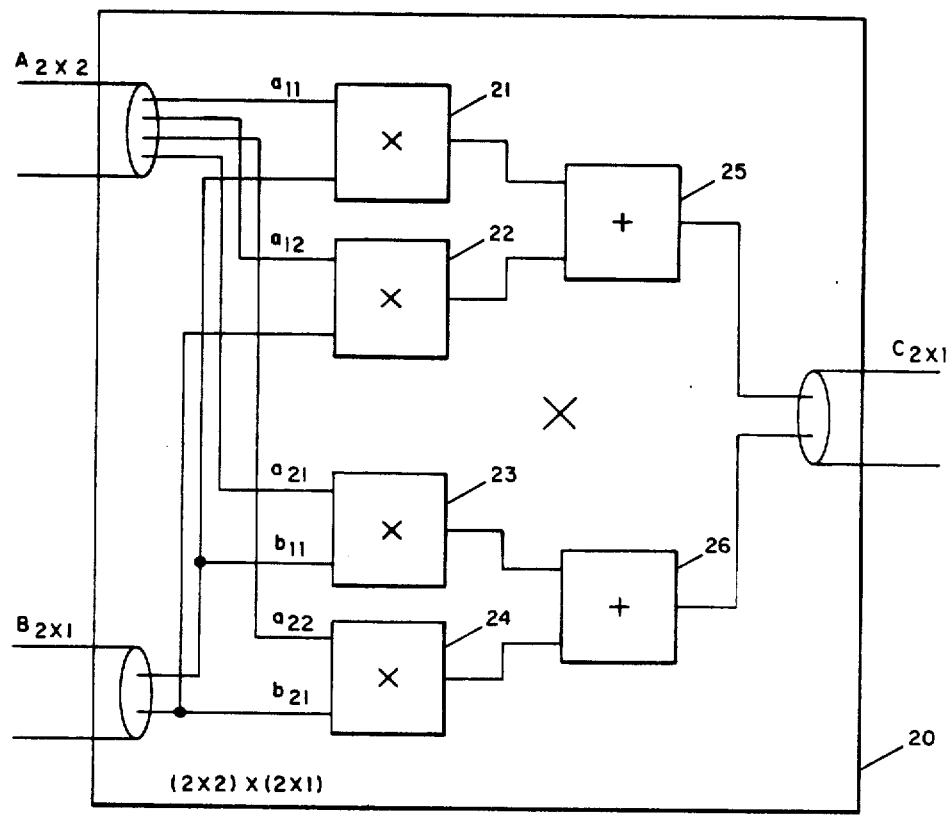
FIG. 5 illustrates the interconnection of primitive function blocks to form a macro function block.

FIG. 5 illustrates a macro function block 20 including the interconnection of primitive function blocks each representing multiplication and addition operations on single input values, to form a block that represents a matrix multiplication operation. The macro function block includes six primitive function blocks, including four primitive multiplication blocks 21-24 and two primitive addition blocks 25 and 26 each of which performs the indicated operation on two individual input values.

When an operator requests the establishment of the macro function block 20, the executive program establishes the header for the macro function block as follows. The operator specifies the dimensions for the inputs and outputs, and so that information is loaded into the respective portions of fields 14 and 15 (FIG. 2B) for the macro function block. The information for the outputs of blocks 21-24 and the inputs of blocks 25 and 26, since they remain internal to the function block, are not represented in the header of the macro function block, unless the information specifies a delay characteristic. If there is a delay characteristic in connection with the outputs of blocks 21-24 or the inputs of blocks 25 or 26, that information is reflected in supplementary information portion (not shown) in header 11 (FIG. 2B).

If, however, the inputs of blocks 21-24 or the outputs of blocks 25 or 26 include, for example, delay characteristics, the executive would include that information in the input and output characteristic information in fields 14 and 15 of header portion 11, (FIG. 2B).

The forgoing description is limited to a specific embodiment of this invention. It will be apparent, however, that this invention can be practiced in data processing systems having diverse basic constructions, or in systems that use different internal circuitry and sequences that are described in the specification, with the attainment of some or all of the advantages of the invention. Therefore, it is the object of the appended claims to cover all such variations and modifications as come within the true spirit and scope of this invention.

What is claimed is:

1. An interactive simulation system for iteratively simulating a complex system represented by a network of interconnected function blocks, the network including at least one input and an output, each function block including means for executing a primitive operation in the simulation and at least one input for receiving an input value to be processed by the function block and an output for transmitting an output value, at least one of said function blocks representing a delay function, said delay function block receiving an input value during an iteration and for transmitting a value representative thereof during a subsequent iteration, said simulation system including input means for receiving from an operator an identification of the function blocks to be used in the simulation from the input of the network to the output of the network with any delay function blocks entered last request, means connected to said input means and operable after all of the function blocks have been entered for requesting the operator to specify the input connection to each of the inputs of the function blocks in the order in which the function blocks were entered, and test means connected to said request means responsive to each entry of a function block input connection for testing to determine whether the input connection was to a previously entered function block or to a delay function block.

2. In an interactive simulation system for iteratively simulating a complex system represented by a network of interconnected function blocks, the network including at least one input and an output, each function block including means for executing a primitive operation in the simulation and at least one input for receiving an input value to be processed by the function block and an output for transmitting an output value, at least one of said function blocks representing a delay function, said delay function block receiving an input value during an iteration and for transmitting a value representative thereof during a subsequent iteration, an input means for use in said simulation system including identification means for receiving from an operator an identification of the function blocks to be used in the simulation from the input of the network to the output of the network with any delay function blocks entered last, request means connected to said input means and operable after all of the function blocks have been entered for requesting the operator to specify the input connection to each of the inputs of the function blocks in the order in which the function blocks were entered, and test means connected to said request means responsive to each entry of a function block input connection for testing to determine whether the input connection was to a previously entered function block or to a delay function block.

3. In an interactive simulation system for iteratively simulating a complex system represented by a network of interconnected function blocks, the network including at least one input and an output, each function block including means for executing a primitive operation in the simulation and at least one input for receiving an input value to be processed by the function block and an output for transmitting an output value, at least one of said function blocks representing a delay function, said delay function block receiving an input value during an iteration and for transmitting a value representative thereof during a subseqent iteration, an input means for use in said simulation system including identification means for receiving from an operator an identification of the function blocks to be used in the simulation from the input of the network to the output of the network with any delay function blocks entered last and request means connected to said identification means and means operable after all of the function blocks have been entered for requesting the operator to specify the input connection to each of the inputs of the function blocks in the order in which the function blocks were entered.

4. An interactive simulation system including processing means and executive program means, said system iteratively simulating a complex system represented by a network of interconnected function blocks, each function block in turn representing a program routine including header means for storing constraint information and body means for storing code identifying the operations to be performed by said processing means, said executive program means including input means for enabling said processing means to receive from an operator an identification of the function blocks to be used in the simulation, request means connected to said input means and operable after all of the function blocks have been entered for requesting the operator to iteratively specify the input connection to each of the inputs of the function blocks in the order in which thè function blocks were entered, and test means connected to said request means responsive to the entering of each input connection for retrieving the constraints stored in the header of the respective block to determine if the connection can be accomplished, and error means connected to said test means for transmitting an error message to the operator if the connection cannot be accomplished.

5. An interactive simulation system including processing means and executive program means, said system iteratively simulating a complex system represented by a network of interconnected function blocks having input means and output means, each function block in turn representing a program routine including header means for storing constraint information and body means for storing code identifying the operations to be performed by said processing means, said executive program means further including means for combining a plurality of function blocks to form a macro function block including header means and body means according to a selected schema such that at least some of the inputs and outputs remain within the schema and others extend outside the schema to form inputs and outputs of the macro function block, said executive program means including composite header formation means for forming a header means in response to the inputs and outputs of the function blocks that extend outside the schema and composite body formation means connected to said composite header formation means for forming a composite of the body means.

* * * * *